United States Patent Office 3,129,218
Patented Apr. 14, 1964

---

3,129,218
2-ALKOXYMETHYLENE STEROIDS OF THE ANDROSTANE AND PREGNANE SERIES
John Fried, Plainfield, Thomas B. Windholz, Westfield, and Ralph F. Hirschmann, Scotch Plains, N.J., assignors to Merck & Co., Inc., Rahway, N.J., a corporation of New Jersey
No Drawing. Filed Nov. 1, 1961, Ser. No. 149,164
21 Claims. (Cl. 260—239.5)

This invention is concerned generally with the preparation of N-substituted-[3,2-c]pyrazoles belonging to the androstane and to the pregnane series of steroid compounds. These compounds may be chemically represented by structures A and B

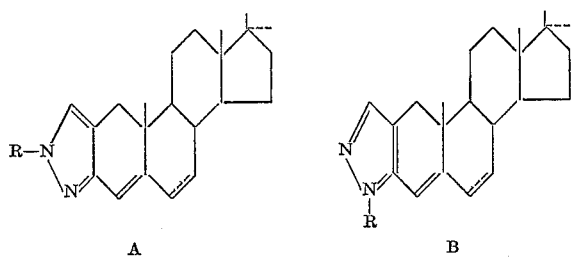

A          B wherein R is hydrogen, alkyl, aralkyl, cycloalkyl, or an aryl group derived from any aromatic nucleus, and wherein the dotted line between carbon atoms 6 and 7 indicates that a double bond may be present in this position.

Compounds having structure "A" are herein designated as 1'-substituted-[3,2-c]pyrazoles, and compounds having structure "B" are designated as the 2'-substituted-[3,2-c] pyrazoles. The steroid nucleus may be substituted or unsubstituted. The substituent groups on the steroid ring are not shown since these groups do not affect the course of the described reactions and in general are unchanged during such reactions. In the androstane series the 19-nor-compounds are also included as a part of this invention.

The N-substituted-4-pregneno-(and 4,6-pregnadieno)-[3,2-c]pyrazoles possess high anti-inflammatory activity, and are especially effective for the treatment of arthritis and related diseases. The N-substituted 4-androsteno-[3,2-c]pyrazoles possess anabolic, androgenic, and progestational properties.

Suitable starting materials for use in our invention include the $17\alpha,21$-dihydroxy-11-oxygenated-4-pregnene-3,20-dione and the $17\alpha,21$-dihydroxy-11-oxygenated-4,6-pregnadiene-3,20-dione compounds, which compounds may be substituted, for example, by groups such as the 6-fluoro-, 6-methyl-, $16\alpha$-methyl-, $16\beta$-methyl, 16-methylene-, $9\alpha$-chloro-, $9\alpha$-fluoro-, or $16\alpha$-hydroxy. Suitable starting materials in the androstane series include testosterone, dihydrotestosterone and the corresponding $17\alpha$-methyl-, $17\alpha$-ethyl-, $17\alpha$-vinyl- and $17\alpha$-ethynyl derivatives, which compounds may also be substituted by other groups.

It is clear to those skilled in the art that still other steroid starting materials may be similarly converted into desired end products.

In accordance with the present invention, the starting material, which is exemplified in the Flow Sheet by a $17\alpha,21$-dihydroxy-11-oxygenated-4-pregnene-3,20-dione, is first protected at the cortical side chain, for example, by treatment with formaldehyde solutions in the presence of strong acid to form a $17\alpha,20,20,21$-bismethylenedioxy-11-oxygenated-4-pregnene-3-one (compound 1). Upon treatment of the latter compound with an alkyl formate and sodium hydride in an inert atmosphere there is formed the corresponding $17\alpha,20,20,21$-bismethylenedioxy-2-hydroxymethylene-11-oxygenated-4-pregnene-3-one (compound 2).

The $17\alpha,20,20,21$-bismethylenedioxy-2-hydroxymethylene-11-oxygenated-4-pregnene-3-one is then reacted with an alkanol in the presence of an acidic reagent to form the corresponding 2-alkoxymethylene-$17\alpha,20,20,21$-bismethylenedioxy-11-oxygenated-4-pregnene-3-one (compound 3). Among the alkanols which may be used for this process are methanol, ethanol, n-propanol, n-butanol, n-pentanol, isopropyl alcohol, secondary-butyl alcohol and the like.

The 2-alkoxymethylene-$17\alpha,20,20,21$-bismethylenedioxy-11-oxygenated-4-pregnene-3-one is contacted with a monosubstituted-hydrazine to form a mixture of the corresponding N-substituted-4-pregneno-[3,2-c] pyrazoles. The N-substituted-pyrazole compounds having structure "A" are designated 1'-substituted-$17\alpha,20,20,21$-bismethylenedioxy- 11 -oxygenated - 4 - pregneno - [3,2-c] pyrazoles (compound 4), and the N-substituted-pyrazole compounds having structure "B" are designated as the 2'-substituted-$17\alpha,20,20,21$-bismethylenedioxy- 11 -oxygenated - 4 - pregneno-[3,2-c]pyrazoles (compound 5). The mixture of steroid compounds is separated by chromatography.

Among the monosubstituted hydrazines which may be used for the process of our invention are: alkylhydrazines, such as methylhydrazine, ethylhydrazine, the propylhydrazines, the butylhydrazines, $\beta$-hydroxyethylhydrazine, cycloalkylhydrazines; arylhydrazines including phenylhydrazine and the substituted phenylhydrazines, such as o-, m-, and p-halophenylhydrazines, o-, m-, and p-tolylhydrazines, o-, m-, and p-alkoxyphenylhydrazines and o-, m-, and p-nitrophenylhydrazines; 1-hydrazinonaphthalene, 2-hydrazinopyridine, 3-hydrazinopyridine, 4-hydrazinopyridine, 4-hydrazinopyridine oxide, and 2-hydrazinopyrimidine; aralkylhydrazines, such as benzylhydrazine and phenylethylenehydrazine.

There are thus produced the corresponding N-substituted-[3,2-c]pyrazoles including: N-alkyl- such as N-methyl-, N-ethyl-, N-propyl-, N-butyl-, N-($\beta$-hydroxyethyl)-; N-cycloalkyl-; the N-aryl- which may be derived from any aromatic nucleus, including N-phenyl- and the N-substituted-phenyl derivatives such as o-, m-, and p-halophenyl-; o-, m-, and p-tolyl-; o-, m-, and p-alkoxyphenyl-; o-, m-, and p-nitrophenyl-; N-(1''-napthyl)-, N-(2''-pyridyl)-, N-(4''-pyridyl)-, N-(4''-pyridyloxide)-, N-(2''-pyrimidyl)-; N-aralkyl-, such as N-benzyl- and N-phenylethenyl-4-pregneno-[3(2-c]pyrazoles.

Upon treatment of the 1'- or 2'-substituted-$17\alpha,20,20,21$-bismethylenedioxy-11-oxygenated-4-pregneno-[3,2-c] pyrazole (compound 4 or 5) with a dilute organic acid, for example, a 60% aqueous solution of formic acid, the $17\alpha,20,20,21$-bismethylenedioxy-protecting group is removed and there is obtained the corresponding $17\alpha,21$-dihydroxy-11-oxygenated-20-oxo-4-pregneno- [3,2-c] pyrazole (compound 6 or 7).

In a similar manner the other steroids described above as starting materials may be converted into to corresponding 1'- and 2'-substituted-pregneno-or androsteno-[3,2-c] pyrazoles.

The following examples illustrate methods of carrying out the present invention but it is to be understood that these examples are given for purposes of illustration and not of limitation.

FLOW SHEET

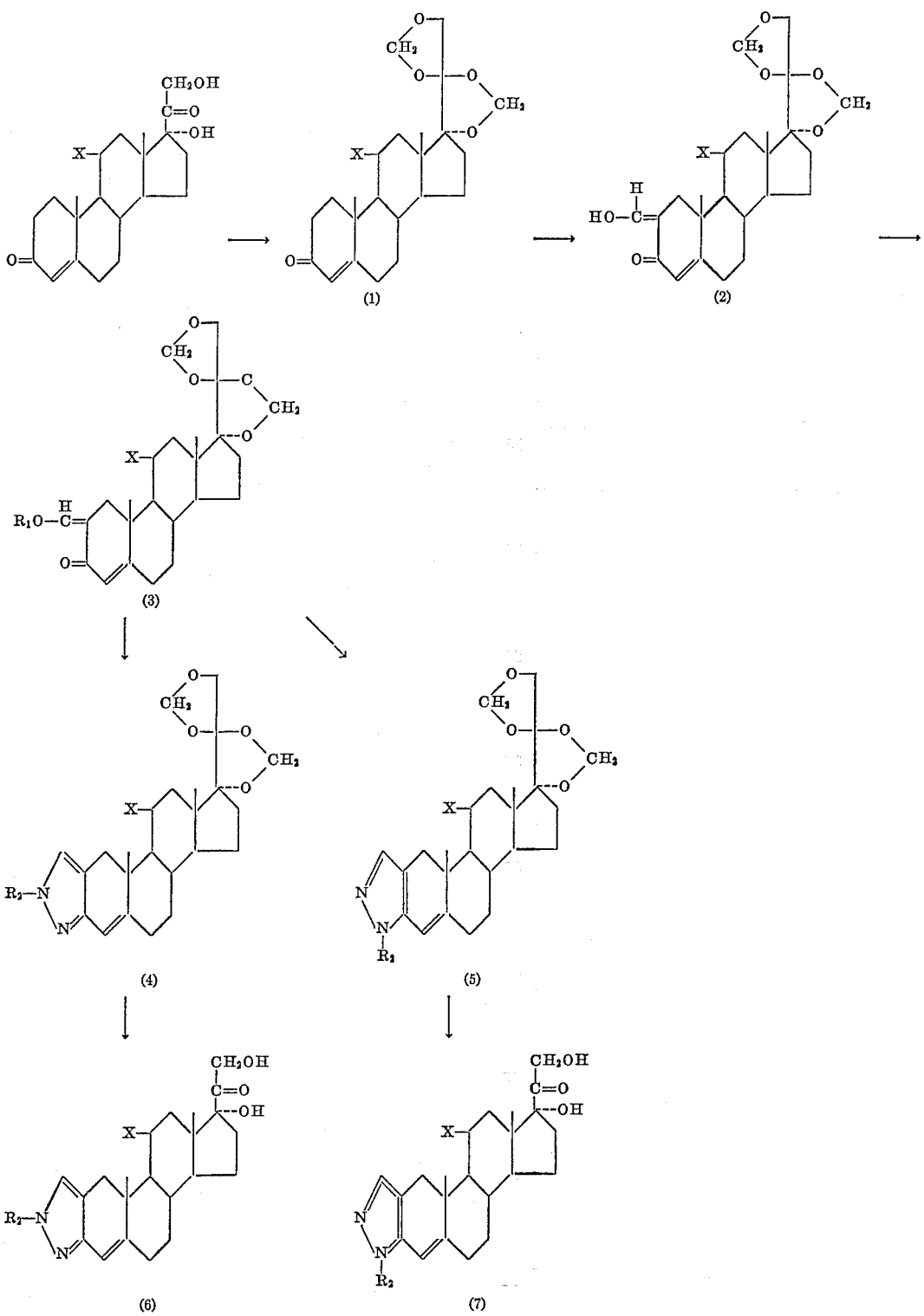

wherein X is β-hydroxy or keto; $R_1$ is alkyl; $R_2$ is alkyl, aralkyl, cycloalkyl or aryl.

Example 1

To a suspension of 25.0 g. of 11β,17α,21-trihydroxy-16α-methyl-4-pregnene-3,20-dione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paperstrip chromatography but shows two U.V. absorbing spots near the solvent front (methanol-formamide 2:1 vs. benzene-n-hexane 1:1). A 2.425 g. aliquot is recrystallized three times from a mixture of benzene and n-hexane to give 17α,20,20,21-bismethylenedioxy-11β-hydroxy-16α - methyl-4-pregnene-3-one, which is used in the subsequent step of the synthesis without further purification.

The 17α,20,20,21-bismethylenedioxy-11β-hydroxy-16α-methyl-4-pregnene-3-one (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α,20,20,21 - bismethylenedioxy-11β-hydroxy-2-hydroxymethylene-16α-methyl-4-pregnene-3-one.

In accordance with the above procedures, but starting with the 17α,21-dihydroxy-16α-methyl-4-pregnene-3,11,20 - trione in place of the 11β,17α,21-trihydroxy-16α-methyl-4-pregnene-3,20-dione, there is obtained the 17α,20,20,21 - bismethylenedioxy-2-hydroxymethylene - 16α-methyl-4-pregnene-3,11-dione.

In accordance with the above procedures, but starting with the 17α,21-dihydroxy-4,6-pregnadiene-3,11,20-trione in place of the 11β,17α,21-trihydroxy-16α-methyl-4-pregnene-3,20-dione there is obtained the 17α,20,20,21-bismethylenedioxy-2-hydroxymethylene - 4,6 - pregnadiene-3,11-dione.

*Example 2*

A mixture of 1 gram of 17α,20,20,21-bismethylenedioxy-2-hydroxymethylene-16α-methyl - 4 - pregnene-3,11-dione, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo to yield 500 mg. of product by direct crystallization. An additional 80 mg. of product is obtained from the mother liquid by chromatography on acid-washed alumina and eluation with ether:chloroform mixtures. On recrystallization from ethyl acetate, an analytical sample of 17α,20,20,21-bismethylenedioxy-2-methoxymethylene - 16α - methyl - 4-pregnene-3,11-dione is obtained which decomposes at 290–320°C., $[\alpha]_D^{24°\ C.}$ +19 (chloroform), U.V. λ max. 252 and 301, E% 251 and 172.

A mixture of 500 mg. of 17α,20,20,21-bismethylenedioxy-2-methoxymethylene-16α-methyl-4-pregnene - 3,11-dione, 100 ml. of ethanol, and 1 ml. of phenylhydrazine is heated under nitrogen until dissolved, and then allowed to stand under nitrogen at room temperature overnight. Acetic acid (2 ml.) is added and the mixture is allowed to stand for another 4 hours. The reaction mixture is then diluted with ethyl acetate, washed two times with 2 N sulfuric acid, 2 times with 2.5 N sodium hydroxide, and then 2 times with water. The ethyl acetate extract is then dried, concentrated, and chromatographed on acid-washed alumina. Elution with benzene affords 270 mg. of product, which on recrystallization from a mixture of benzene and ethyl acetate affords 17α,20,20,21-bismethylenedioxy - 16α - methyl-11-oxo-1'-phenyl - 4 - pregneno-[3,2-c]pyrazole, M.P. 268–275° C., $[\alpha]_D^{24°\ C.}$ −15 (chloroform);

U.V. $\lambda_{max.}^{MeOH}$ 297 mμ, E% 606

Further elution with a mixture of 1:1 ether:petroleum ether, and crystallization from benzene, affords 270 mg. of 17α,20,20,21-bismethylenedioxy-16α-methyl-11-oxo-2'-phenyl-4-pregneno-[3,2-c]pyrazole, M.P. 304–312° C., $[\alpha]^{24°\ C.}$ +81; U.V. λ max. 262, E% 324.

*Example 3*

17α,20,20,21 - bismethylenedioxy-2-hydroxymethylene-16α-methyl-4-pregnene-3,11-dione (100 mg.) is suspended in 3 ml. of isopropanol and 30 mg. of p-toluenesulfonic acid is added. The mixture is stirred at room temperature under nitrogen for 3½ hours and then poured into water and extracted with ether. The ether extract is washed first with a saturated sodium bicarbonate solution, and then under water. The ether solution is then dried and concentrated under vacuum to give a semicrystalline solid which is the 17α,20,20,21-bismethylenedioxy-2-isopropoxymethylene-16α-methyl-4-pregnene-3,11-dione.

To 50 mg. of the above crude product dissolved in 50 ml. of absolute ethanol is added 0.1 ml. of phenylhydrazine. The mixture is let stand at room temperature over night. Glacial acetic acid (0.2 ml.) is then added and the mixture is allowed to stand for another 4 hours. The reaction mixture is diluted with ethyl acetate, and the ethyl acetate solution is washed with 2 N sulfuric acid, then with 2 N sodium hydroxide and finally two times with water. The ethyl acetate solution is then dried and concentrated. The resulting crude product is chromatographed over acid washed alumina and eluted with benzene to afford the 17α,20,20,21-bismethylenedioxy-16α-methyl - 11 - oxo-1'-phenyl-4-pregneno-[3,2-c]pyrazole, M.P. 268–275° C.

*Example 4*

A mixture of 210 mg. of 17α,20,20,21-bismethylenedioxy - 16α - methyl-11-oxo-1'-phenyl-4-pregneno-[3,2-c] pyrazole, 20 ml. of tetrahydrofuran, and 300 mg. of lithium aluminum hydride is heated at reflux temperature for one hour and 15 minutes. The lithium aluminum hydride is destroyed by the careful addition of ethyl acetate, and then 3.9 ml. of water is added. The suspension is filtered and the filtrate is concentrated in vacuo to give a crude product which is chromatographed on acid-washed alumina. Elution with ether: petroleum ether mixtures yields 150 mg. of 17α,20,20,21-bismethylenedioxy-11β-hydroxy-16α-methyl-1'-phenyl - 4 - pregneno-[3,2-c]pyrazole. An analytical sample which is crystallized from ether has a M.P. of 218–222° C., U.V. λ max. 298, E% 610.

*Example 5*

A mixture of 5 grams of 17α,20,20,21-bismethylenedioxy-11β-hydroxy-2-hydroxymethylene - 16α - methyl-4-pregnene-3-one, 100 ml. of methanol, and 1 gm. of p-toluenesulfonic acid is allowed to stand at room temperature for one hour. The reaction mixture is then diluted with water and taken up in ethyl acetate. The ethyl acetate extract is washed sequentially with 2 N sodium hydroxide and then with water. The ethyl acetate solution is then dried and concentrated in vacuo to afford 4.1 g. of a product which is chromatographed on acid-washed alumina. Elution with ether-petroleum ether mixtures gives 17α,20-20,21-bismethylenedioxy - 11β - hydroxy-2-methoxymethylene-16α-methyl-4-pregnene - 3 - one, M.P. 176–193° C.; U.V. λ max. 254, 300; E% 245, 162.

In accordance with the above procedure, but using isopropyl alcohol in place of methanol, the 17α,20,20,21-bismethylenedioxy - 11β - hydroxy-2-isopropoxymethylene-16α-methyl-4-pregnene-3-one is obtained.

*Example 6*

A mixture of 2 grams of 17α,20,20,21-bismethylenedioxy-11β-hydroxy-2-hydroxymethylene - 16α - methyl-4-pregnene-3-one, 200 ml. of ethanol, and 4 ml. of phenylhydrazine is warmed to get into solution and the reaction is allowed to stand at room temperature overnight. Then 8 ml. of acetic acid is added and the mixture is allowed to stand at room temperature for 4 hours. The material is concentrated in vacuo to a small volume, diluted with water and filtered. The material on the filter is then dried, and chromatographed on acid-washed alumina and eluted with ether-petroleum ether mixtures. There is obtained 100 mg. of 17α,20,20,21-bismethylenedioxy-11β-hydroxy - 16α-methyl-1'-phenyl-4-pregneno-[3,2-c]pyrazole, M.P. 215–220° C., which is identical with the product obtained in Example 4.

*Example 7*

A mixture of 130 mg. of 17α,20,20,21-bismethylenedioxy-11β-hydroxy-16α-methyl-1'-phenyl - 4 - pregneno-[3,2-c]pyrazole and 20 ml. of 60% formic acid is heated on a steam bath for 30 minutes. The solution is cooled and taken up in chloroform. The chloroform extract is washed with water and aqueous sodium bicarbonate solution, and then dried and concentrated in vacuo. The crude product is then treated with 0.25 cc. of 0.5 N sodium methylate in methanol for 30 minutes at room temperature. Several drops of acetic acid are then added and the solution is then taken up in chloroform, and washed sequentially with water and then sodium bicarbonate. The chloroform extract is dried and concentrated in vacuo. Crystallization from ethyl acetate affords 11β, 17α,21 - trihydroxy-16α-methyl-20-oxo-1'-phenyl-4-pregneno-[3,2-c]pyrazole, M.P. 209–221° C., $[\alpha]_D^{24°\ C.}$ +50, U.V. λ max. 298 mγ, E% 608.

*Example 8*

500 mg. of 17α,20,20,21-bismethylenedioxy-11β-hydroxy-16α-methyl-2'-phenyl-4-pregneno - [3,2-c]pyrazole is heated on a steam bath with 50 ml. of 60% formic acid for 35 minutes. The solvents are removed in vacuo, water is added and the product is filtered off to give a mixture of 11β,17α,21-trihydroxy-16α-methyl-20-oxo-2'-phenyl-4-pregneno-[3,2-c]pyrazole, and its 21-formate. The presence of formate is indicated by infrared absorption at 5.81 and 8.5μ.

The crude product is dissolved in 75 ml. of pure methanol and allowed to react with 0.54 ml. of a 0.94 N solution of sodium methoxide in methanol at room temperature under a nitrogen atmosphere for 10 minutes. The alkoxide is neutralized with acetic acid and the mixture is then taken to dryness and flushed with n-hexane. The residue is washed with water, filtered and dried to constant weight to give 11β,17α,21-trihydroxy-16α-methyl-20-oxo-2'-phenyl-4-pregneno-[3,2-c]pyrazole, $\lambda_{max.}^{CHCl_3}$ 2.8–3.0μ, 5.84μ, 6.13μ, 6.21μ and 6.61μ

2.8–3.0μ, 5.84μ, 6.13μ, 6.21μ and 6.61μ

*Example 9*

A mixture of 1 gram of 17α,20,20,21-bismethylyenedioxy-2-hydroxymethylene-4,6-pregnadieno - 3,11 - dione 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α,20,20,21-bismethylenedioxy-2-methoxymethylene-4,6-pregnadiene-3,11 - dione is obtained by chromatography on acid-washed alumina and elution with ether:chloroform mixtures.

In accordance with the above procedure, but using another alkanol in place of methanol, the corresponding 2-alkoxymethylene - 17α,20,20,21 - bismethylenedioxy-4,6-pregnadiene-3,11-dione is obtained.

In accordance with the above procedures, but starting with the 17α,20,20,21-bismethylenedioxy-2-hydroxymethylene-16α-methyl-4,6-pregnadiene-3,11-dione, the corresponding 16α-methyl-derivatives are formed.

A mixture of 500 mg. of 17α,20,20,21-bismethylenedioxy-2-methoxymethylene-4,6-pregnadiene-3,11-dione 100 ml. of ethanol, and 1 ml. of methylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene and then with mixtures of ether and petroleum ether affords the 17α,20,20,21 - bismethylenedioxy-11-oxo-1'-methyl - 4,6 - pregnadieno-[3,2-c]pyrazole and the 17α,20,20,21-bismethylenedioxy-2'-methyl - 11 - oxo - 4,6 - pregnadieno-[3,2-c]-pyrazole.

*Example 10*

A 1.350 g. portion of 17β-hydroxy-4-androstene-3-one is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17β-hydroxy-2-hydroxy-2-hydroxymethylene-4-androstene-3-one.

A mixture of 1 gram of 17β-hydroxy-2-hydroxymethylene-4-androstene-3-one, 20 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17β-hydroxy - 2 - methoxymethylene-4-androstene-3-one is obtained by chromatography on acid-washed alumina and elution with ether:chloroform mixtures.

In accordance with the above procedure, but using another alkanol in place of methanol, the corresponding 2-alkoxymethylene-17β-hydroxy-4-androstene - 3 - one is obtained.

A mixture of 500 mg. of 17β-hydroxy-2-methoxymethylene-4-androstene-3-one, 100 ml. of ethanol, and 1 ml. of cyclohexylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina, and then with mixtures of ether and petroleum ether affords the 1'-cyclohexyl-17β-hydroxy-4-androsteno - [3,2 - c]pyrazole, and the 2'-cyclohexyl-17β-hydroxy-4-androsteno-[3,2-c]-pyrazole.

Example 11

A 1.350 g. portion of 17α-ethynyl-17β-hydroxy-19-nor-4-androstene-3-one is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 17α-ethynyl - 17β - hydroxy-2-hydroxymethylene-19-nor-4-androstene-3-one.

A mixture of 1 gram of 17α-ethynyl-17β-hydroxy-2-hydroxymethylene-19-nor-4-androstene-3-one, 200 ml. of methanol, and 200 mg. of p-toluenesulfonic acid is heated to reflux temperature and then allowed to stand at room temperature for one hour. The reaction mixture is then diluted with water and extracted with ethyl acetate. The ethyl acetate extract is washed two times with 2 N aqueous sodium hydroxide solution and then with water. The ethyl acetate extract is then dried and concentrated in vacuo. The 17α-ethynyl-17β-hydroxy-2-methoxymethylene-19-nor-4-androstene-3-one is obtained by chromatography on acid-washed alumina and elution with ether: chloroform mixtures.

In accordance with the above procedure, but using another alkanol in place of methanol the corresponding 2 - alkoxymethylene - 17α - ethynyl-17β-hydroxy-19-nor-4-androstene-3-one is obtained.

A mixture of 500 mg. of 17α-ethynyl-17β-hydroxy-2-methoxymethylene-19-nor-4-androstene-3-one, 100 ml. of ethanol, and 1 ml. of benzylhydrazine is heated under nitrogen until dissolved, and then allowed to stand under nitrogen at room temperature over night. Acetic acid (2 ml.) is added and the mixture is allowed to stand for another 4 hours. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on acid-washed alumina. Elution with benzene and then with mixtures of ether and petroleum ether affords the 1'-benzyl-17α-ethynyl - 17β - hydroxy-19-nor-4-androsteno-[3,2-c]pyrazole and the 2'-benzyl-17α-ethynyl-17β-hydroxy-19-nor-4-androsteno-[3,2-c]pyrazole.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a 2-hydroxymethylene-steroid selected from the group consisting of 2-hydroxymethylene-3-keto-steroids of the androstane series and 2-hydroxymethylene - 3 - keto-17,20,20,21-bismethylenedioxy-steroids of the pregnane series with an alkanol and an acidic reagent to form the corresponding 2-alkoxymethylene-steroid.

2. The process which comprises reacting a 2-alkoxymethylene-steroid selected from the group consisting of 2-hydroxymethylene-3-keto-steroids of the androstane series and 2-hydroxymethylene - 3 - keto-17,20,20,21-bismethylenedioxy-steroids of the pregnane series with a monosubstituted hydrazine in an inert atmosphere to form a mixture of the corresponding 1'-substituted-steroidal-[3,2-c]pyrazole and the 2'-substituted-steroidal-[3,2-c]pyrazole, and separating said 1'-substituted-steroidal-[3,2-c]pyrazole and said 2'-substituted-[3,2-c]pyrazole by chromatography.

3. The process which comprises reacting a 17α,20,20,21-bismethylenedioxy - 2 - hydroxymethylene-11-oxygenated-4-pregnene-3-one with an alkanol and an acidic reagent to form the corresponding 2-alkoxymethylene-17α,20,20,21 - bismethylenedioxy - 11 - oxygenated-4-pregnene-3-one.

4. The process which comprises reacting a 2-alkoxymethylene - 17α,20,20,21 - bismethylenedioxy-11-oxygenated-4-pregnene-3-one with a monosubstituted-hydrazine in an inert atmosphere to form a mixture of the corresponding 1' - substituted-17α,20,20,21-bismethylenedioxy-11-oxygenated-4-pregneno-[3,2-c]pyrazole and 2'-substituted-17α,20,20,21-bismethylenedioxy - 11 - oxygenated-4-pregneno-[3,2-c]pyrazole, and separating the components of said mixture by chromatography.

5. The process which comprises reacting a 17α,20,20,21-bismethylenedioxy - 2 - hydroxymethylene-11-oxygenated-4,6-pregnadiene-3-one with an alkanol and an acidic reagent to form the corresponding 2-alkoxymethylene-17α,20,20,21 - bismethylenedioxy-11-oxygenated-4,6-pregnadiene-3-one.

6. The process which comprises reacting a 2-alkoxymethylene - 17α,20,20,21 - bismethylenedioxy-11-oxygenated-4,6-pregnadiene-3-one with a monosubstituted-hydrazine in an inert atmosphere to form a mixture of the corresponding 1'-substituted-17α,20,20,21-bismethylenedioxy-11-oxygenated-4,6-pregnadieno - [3,2-c]pyrazole and the 2'-substituted - 17α,20,20,21 - bismethylenedioxy-11-oxygenated-4,6-pregnadieno-[3,2-c]pyrazole, and seaprating the components of said mixture by chromatography.

7. The process which comprises heating 17α,20,20,21-bismethylenedioxy - 2 - hydroxymethylene-16α-methyl-4-pregnene-3,11-dione, with methanol in the presence of p-toluenesulfonic acid to form 17α,20,20,21-bismethylenedioxy - 2 - methoxymethylene - 16α - methyl-4-pregnene-3,11-dione.

8. The process which comprises heating 17α,20,20,21-bismethylenedioxy - 2 - methoxymethylene-16α-methyl-4-pregnene-3,11-dione with phenylhydrazine in an inert atmosphere to form a mixture of 17α,20,20,21-bismethylenedioxy - 16α - methyl - 11 - oxo-1'-phenyl-4-pregneno-[3,2-c]pyrazole and 17α,20,20,21-bismethylenedioxy-16α-methyl-11-oxo-2'-phenyl-4-pregneno-[3,2-c]pyrazole, and separating the components of said mixture by chromatography.

9. The process which comprises reacting a 2-hydroxymethylene - 17β - hydroxy-4-androstene-3-one compound with an alkanol in an acidic reagent to form the corresponding 2-alkoxymethylene-17β-hydroxy-4-androstene-3-one.

10. The process which comprises reacting a 2-alkoxymethylene - 17β - hydroxy-4-androstene-3-one compound with a monosubstituted hydrazine in an inert atmosphere to form a mixture of the corresponding 1'-substituted-17β-hydroxy-4-androsteno-[3,2-c]pyrazole and the 2'-substituted-17β-hydroxy-4-androsteno - [3,2-c]pyrazole, and separating the components of said mixture by chromatography.

11. The process which comprises reacting a 2-hydroxymethylene-17β-hydroxy-19-nor-4-androstene-3-one compound with an alkanol and an acidic reagent to form the corresponding 2-alkoxymethylene-17β-hydroxy-19-nor-4-androstene-3-one.

12. The process which comprises reacting a 2-alkoxymethylene-17β-hydroxy-19-nor-4-androstene-3-one compound with a monosubstituted hydrazine in an inert atmosphere to form a mixture of the corresponding 1'-substituted - 17β - hydroxy-19-nor-4-androsteno-[3,2-c]pyrazole and the 2'-substituted-17β-hydroxy-19-nor-4-androsteno-[3,2-c]pyrazole, and separating the components of said mixture by chromatography.

13. 2-alkoxymethylene - 17α,20,20,21 - bismethylenedioxy-11β-hydroxy-16α-methyl-4-pregnene-3-one.

14. 17α,20,20,21 - bismethylenedioxy - 11β - hydroxy-2-methoxymethylene-16α-methyl-4-pregnene-3-one.

15. 17α,20,20,21 - bismethylenedioxy - 11β - hydroxy-2-isopropoxymethylene-16α-methyl-4-pregnene-3-one.

16. 2-alkoxymethylene - 17α,20,20,21 - bismethylenedioxy-16α-methyl-4-pregnene-3,11-dione.

17. 17α,20,20,21 - bismethylenedioxy - 2 - isopropoxymethylene-16α-methyl-4-pregnene-3,11-dione.

18. 17α,20,20,21-bismethylenedioxy - 2 - methoxymethylene-16α-methyl-4-pregnene-3,11-dione.

19. 17α,20,20,21 - bismethylenedioxy - 16α - methyl - 2 - methoxymethylene-4,6-pregnadiene-3,11-dione.

20. 2-alkoxymethylene - 17α,20,20,21 - bismethylenedioxy-4,6-pregnadiene-3,11-dione.

21. 2-alkoxymethylene - 17α - ethynyl-17β-hydroxy-19-nor-4-androstene-3-one.

References Cited in the file of this patent
UNITED STATES PATENTS 2,927,933    Babcock et al. _____ Mar. 8, 1960

OTHER REFERENCES

Loewenthal: Tetrahedron, vol. 6, No. 4, June 1959, pages 281–283.

Clinton et al.: J.A.C.S., vol. 83, March 20, 1961, pages 1478–1491.

Notice of Adverse Decision in Interference

In Interference No. 96,291 involving Patent No. 3,129,218, J. Fried, T. B. Windholz and R. F. Hirschmann, 2-ALKOXYMETHYLENE STEROIDS OF THE ANDROSTANE AND PREGNANE SERIES, final judgment adverse to the patentees was rendered May 6, 1969, as to claim 1.

[*Official Gazette August 5, 1969.*]